(12) United States Patent
Ravulur et al.

(10) Patent No.: US 7,925,635 B1
(45) Date of Patent: Apr. 12, 2011

(54) SYSTEM AND METHOD FOR COLLECTING STATISTICS RELATED TO SOFTWARE USAGE

(75) Inventors: Rahul C. Ravulur, Sunnyvale, CA (US); David R. Wegman, San Francisco, CA (US); Gregory Gerard, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 1011 days.

(21) Appl. No.: 11/112,175

(22) Filed: Apr. 22, 2005

Related U.S. Application Data (60) Provisional application No. 60/564,874, filed on Apr. 23, 2004.

(51) Int. Cl.
G06F 17/00 (2006.01)
G06F 7/00 (2006.01)
(52) U.S. Cl. ............ 707/688; 705/52; 705/59; 717/127
(58) Field of Classification Search .................. None
See application file for complete search history.

(56) References Cited

U.S. PATENT DOCUMENTS

| | | | | |
|---|---|---|---|---|
| 5,260,999 A * | 11/1993 | Wyman | ............................ | 705/59 |
| 5,388,211 A * | 2/1995 | Hornbuckle | .................. | 717/178 |
| 5,438,508 A * | 8/1995 | Wyman | .............................. | 705/8 |
| 5,497,479 A * | 3/1996 | Hornbuckle | .................... | 463/29 |
| 5,499,340 A * | 3/1996 | Barritz | ............................. | 714/47 |
| 5,579,222 A * | 11/1996 | Bains et al. | ................... | 717/167 |
| 5,590,056 A * | 12/1996 | Barritz | .......................... | 702/186 |
| 5,613,089 A * | 3/1997 | Hornbuckle | .................. | 711/164 |
| 5,649,187 A * | 7/1997 | Hornbuckle | ............. | 707/999.01 |
| 5,745,879 A * | 4/1998 | Wyman | .......................... | 705/1.1 |
| 5,848,396 A * | 12/1998 | Gerace | ............................ | 705/10 |
| 5,949,415 A * | 9/1999 | Lin et al. | ........................ | 715/740 |
| 5,970,143 A * | 10/1999 | Schneier et al. | .............. | 713/181 |
| 5,991,735 A * | 11/1999 | Gerace | ............................ | 705/10 |
| 6,122,663 A * | 9/2000 | Lin et al. | ....................... | 709/224 |
| 6,167,358 A * | 12/2000 | Othmer et al. | ................ | 702/188 |
| 6,199,204 B1 * | 3/2001 | Donohue | ...................... | 717/178 |
| 6,202,199 B1 * | 3/2001 | Wygodny et al. | ............. | 717/125 |
| 6,792,460 B2 * | 9/2004 | Oulu et al. | .................... | 709/224 |
| 6,938,027 B1 * | 8/2005 | Barritz et al. | ................... | 706/50 |
| 6,978,291 B2 * | 12/2005 | Vardi et al. | .................... | 709/202 |
| 6,996,807 B1 * | 2/2006 | Vardi et al. | .................... | 717/127 |
| 7,055,145 B2 * | 5/2006 | Hatalkar | ........................ | 717/154 |
| 7,096,253 B2 * | 8/2006 | Vinson et al. | ................. | 709/203 |
| 7,155,414 B2 * | 12/2006 | Barritz et al. | .................... | 705/59 |
| 7,194,439 B2 * | 3/2007 | Kassan et al. | ................... | 705/51 |
| 7,197,431 B2 * | 3/2007 | Barritz | .......................... | 702/186 |
| 7,225,137 B1 * | 5/2007 | Barritz | .......................... | 705/348 |
| 7,362,862 B2 * | 4/2008 | Schneier et al. | .............. | 380/251 |

(Continued)

OTHER PUBLICATIONS

Business Wire "Isogon Ships 'Galaxy': The First Software Suite to Integrate All Aspects of IT Asset Management", Press Release, Sep. 28, 2000.*

(Continued)

*Primary Examiner* — Luke S Wassum
(74) *Attorney, Agent, or Firm* — Wong, Cabello, Lutsch, Rutherford & Brucculeri, L.L.P.

(57) ABSTRACT

A system and method identifies the times that certain applications are started and stopped on a computer system and such information about several computer systems is collected using a central computer system to allow decisions regarding software may be made based on usage of those certain applications.

26 Claims, 3 Drawing Sheets

U.S. PATENT DOCUMENTS

| | | | |
|---|---|---|---|
| 2001/0044705 A1* | 11/2001 | Vardi et al. | 702/186 |
| 2002/0022971 A1* | 2/2002 | Tanaka et al. | 705/1 |
| 2002/0026631 A1* | 2/2002 | Barritz | 717/127 |
| 2002/0091753 A1* | 7/2002 | Reddy et al. | 709/202 |
| 2002/0116340 A1* | 8/2002 | Hellberg et al. | 705/59 |
| 2002/0161717 A1* | 10/2002 | Kassan et al. | 705/59 |
| 2003/0083994 A1* | 5/2003 | Ramachandran et al. | 705/52 |
| 2003/0083995 A1* | 5/2003 | Ramachandran et al. | 705/52 |
| 2003/0083998 A1* | 5/2003 | Ramachandran et al. | 705/59 |
| 2003/0083999 A1* | 5/2003 | Ramachandran et al. | 705/59 |
| 2003/0084000 A1* | 5/2003 | Ramachandran et al. | 705/59 |
| 2003/0084341 A1* | 5/2003 | Ramachandran et al. | 713/201 |
| 2003/0177347 A1* | 9/2003 | Schneier et al. | 713/151 |
| 2004/0019878 A1* | 1/2004 | Kotnur et al. | 717/120 |
| 2004/0226018 A1* | 11/2004 | Motoyama et al. | 719/310 |
| 2006/0093142 A1* | 5/2006 | Schneier et al. | 380/251 |
| 2006/0107256 A1* | 5/2006 | Zarenin et al. | 717/127 |

OTHER PUBLICATIONS

Isogon "SoftAudit for UNIX: Product Overview", White Paper, Fall 2002.*

BMC Software "Marimba Client Management from BMC Software", Product Brochure, 2003.*

Isogon "SoftAudit for z/OS", Product Brochure, 2004.*

BMC Software "BMC® Software Usage", Product Datasheet, 2006.*

* cited by examiner

SYSTEM AND METHOD FOR COLLECTING STATISTICS RELATED TO SOFTWARE USAGE

RELATED PATENT

This application claims the benefit of U.S. Provisional Patent Application Ser. No. 60/564,874 entitled, "System and Method for Collecting Statistics Related to Software Usage", filed on Apr. 23, 2004 by David Wegman, and is related to the subject matter of U.S. Pat. No. 5,919,247 entitled, "Method for the Distribution of Code and Data Updates" issued on Jul. 6, 1999 to Arthur van Hoff, Sami Shaio and Jonathan Payne, having the same assignee as this application and each is incorporated herein by reference in its entirety.

FIELD OF THE INVENTION

The present invention is related to computer software and more specifically to computer software for inventory management.

BACKGROUND OF THE INVENTION

Some business entities pay for each copy of software they install. The entity may receive only a limited number of physical copies of a particular program or suite of programs, and the entity pays for the right to install the software on a set number of computers. Because the entity must pay for the number of computers on which the software is installed, if some of the users of those computers are not using the software, the entity pays for software which is not being used, and thus, the entity is not using its software budget efficiently.

Even if a user is using the software, the user may not be using the software sufficiently to justify its cost, and again, the entity's software budget may not be used efficiently. For example, if a user is using a computer program infrequently or for a very short period of time, the entity may be able to provide a less expensive computer program to those users.

However, it is difficult to determine whether a user of a computer system on which software is installed is using the software sufficiently to justify its cost, and the thresholds for determining whether a user is sufficiently using software may change over time as the price of the software and alternative software changes and the availability of alternatives changes. Surveys of users can be performed and entered into a database, but surveys have their own inherent problems. Self surveys of users are cumbersome for the users to perform, and even if performed, the users may not accurately report their usage of the software, making the survey inaccurate. Alternatively, a surveyor may sit next to the person and watch their use of the software. Although this process can result in accurate survey results, it is time consuming and may make the user uncomfortable. Furthermore, surveys would have to be repeated over and over as prices and availability of alternatives changed, making the use of surveys too expensive to offset the savings that they could achieve.

What is needed is a system and method that can accurately report software usage, and provide up to date information on usage to allow software to be efficiently allocated according to any set of rules.

SUMMARY OF INVENTION

A system and method identifies programs whose usage should be tracked and identifies an identifier corresponding to each such program. The system and method then operates as a continuously or periodically operating process on the user's computer system. The system and method periodically requests from the operating system identifiers of each of the running programs on the user's computer system, and compares the set of software being tracked that are in a list of such programs it receives, with the set of tracked programs that were in the list it received from a prior request. Differences between the two sets are logged as an initiation or termination of use and, for each use of the software, the start time and end time is logged with an identifier of the user or the system on which the software was run and optionally, the name and version identifier of the software. The logs from each of many such systems are periodically sent to a database on a server. The decision maker can then query the database to identify whether, and for which users, a piece of software is being used sufficiently to justify its cost or the cost of another program.

The programs identified as programs that should be tracked may include either or both of programs that are being inventoried as well as other programs of interest. The inventory process locates an executable file given the name of the program in the start menu, the name of a program entered in a registry, the name of the program registered to an installation database, such as the Microsoft Installer, MSI or another similar technique. Once found, the system and method looks at the header of the ".exe" or other file to locate the name and version of the program. Other programs may be identified to be tracked in this manner, but for such programs, in one embodiment, the name of the executable and the path in which the program is located must be supplied, as the system doesn't locate it using the techniques described above, although in another embodiment, the directory is not needed and the system and method searches for such programs as well.

DETAILED DESCRIPTION OF A PREFERRED EMBODIMENT

Figure 1:
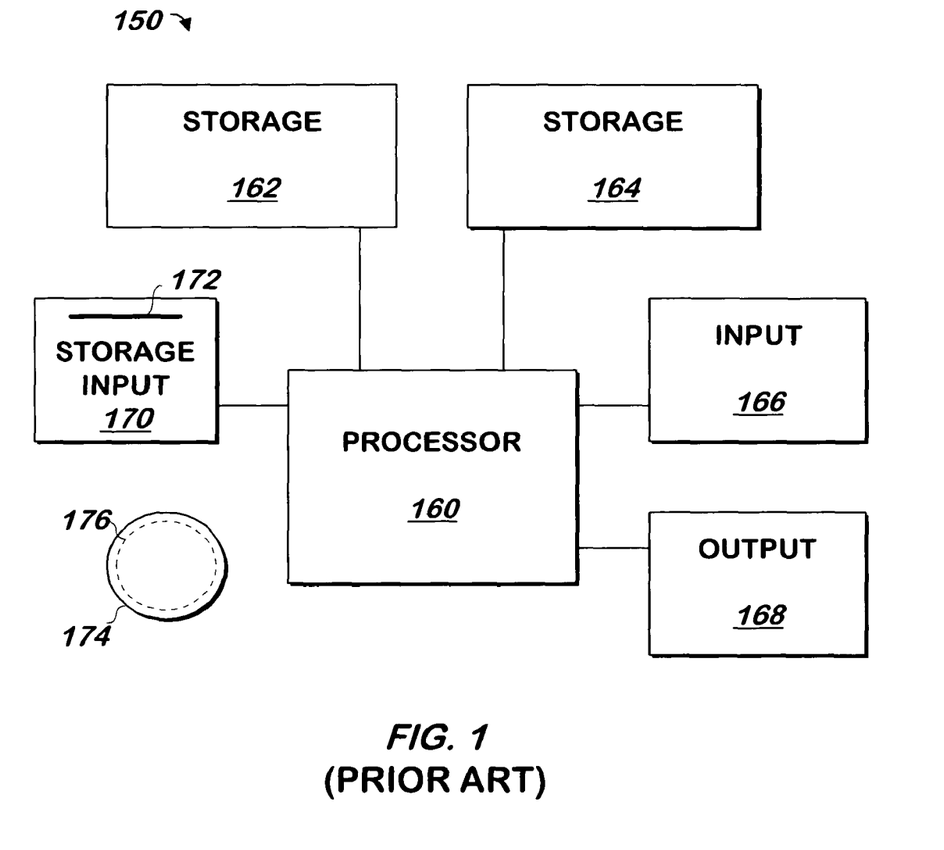
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
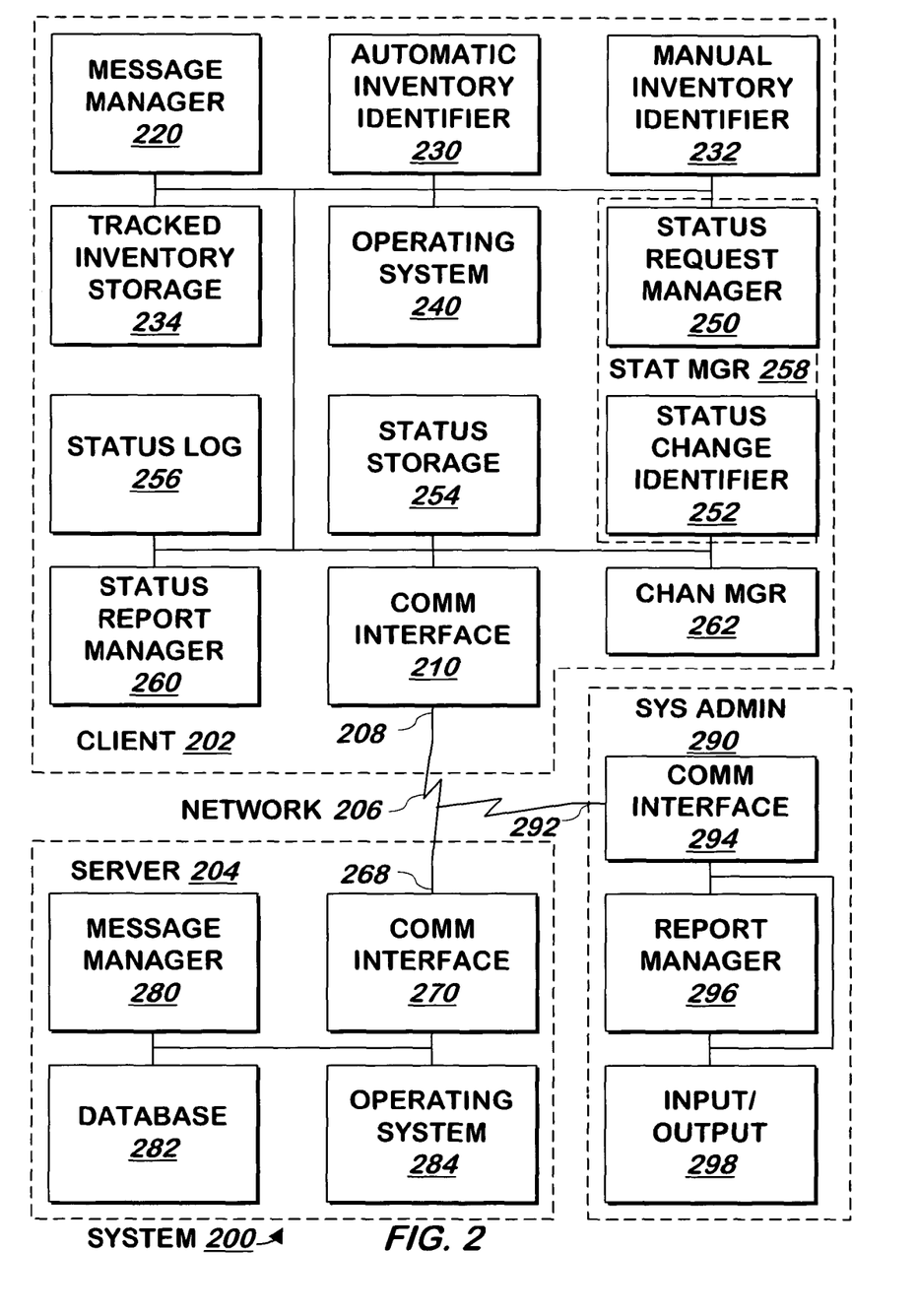
FIG. 2 is a block schematic diagram of a system for collecting and providing software usage statistics according to one embodiment of the present invention.

Referring now to FIG. 2, a system 200 for collecting and providing software usage statistics is shown according to one embodiment of the present invention. System 200 consists of a server 204, a system administration system 290, and one or more clients 202, all coupled via a network 206 such as an Ethernet network, the Internet, or both. Client 202, system administration system 290 and server 204 may be conventional computer systems, such as any of those described above.

Client

In one embodiment, all communication between client 202 and network 206 is made via input/output 208 of communication interface 210 which is coupled to network 206. Communication interface 210 is a conventional communication interface that supports TCP/IP or other conventional communication protocols.

Communication interface 210 receives messages and forwards the messages to message manager 220. Message manager 220 identifies the types of message from a message header and forwards the message to the appropriate component 230, 232 or 260 of client as described in detail below.

Setting Up The Tracked Inventory List

In one embodiment, applications whose use is tracked by system 200 (referred to as "tracked" applications or programs) are either of two types. The first type of tracked applications are those for which certain characteristics are known, although the location on client 202 of these applications may vary from one client to the next. The characteristics of such tracked applications may be known because such tracked applications have been installed in an authorized manner, such as is described in the related application.

The other type of tracked applications may have been installed in an unauthorized manner, and therefore, different characteristics may be known about such tracked applications. For example, if the characteristic of the first type of application is the name of the program, the characteristics of the second type of applications may be the path and filename of the executable file that is used to start the application.

Thus, the difference between the supplied characteristics of each type of tracked application may be in the number of characteristics supplied for each type of tracked application or the kind of characteristics supplied for each type of tracked application, or both. Characteristics having a different "kind" are characteristics that describe a different quality or aspect of a tracked application. For example, the name of the executable program (e.g. "WinWord") is a "kind" of characteristic that is different from the path and filename of that executable (even though "WinWord" may also be part of the file name).

In one embodiment, a manifest containing certain characteristics of the first type of tracked applications for which usage tracking is desired is received as part of a message having a header identifying it as such a message by message manager 220 via communication interface 210. Message manager 220 looks at the header of the message and forwards some or all of the message to automatic inventory identifier 230.

Automatic inventory identifier 230 uses the characteristics contained in the manifest to locate each tracked application described by the manifest. For example, the manifest may contain the name of each application to be located. Automatic inventory identifier 230 then locates the tracked applications that are installed on client system 202 that correspond to the characteristics contained in the manifest.

To locate any such tracked applications, in one embodiment, automatic inventory identifier 230 scans the list of applications in the start menu, the registry and the Microsoft Installer known as MSI for applications installed (which includes applications residing) "on client system 202" (e.g. those actually installed on client system 202 as opposed to applications which may be reachable from client system 202 via a network) and attempts to locate applications having the names of the tracked applications that were received in the manifest. In one embodiment, if any such application is located, automatic inventory identifier 230 identifies the path and filename of the executable that corresponds to the name (e.g. using the filename property of the start menu item), and then, using the path and filename of the executable file, examines a header in the located executable file of each such located tracked application to retrieve the name of the application, version number and manufacturer name. For each such tracked application it finds, automatic inventory identifier 230 stores into tracked inventory storage 234 an entry containing the name of the tracked application, version number, and the path and filename of the executable. Tracked inventory storage 234 may be conventional memory or disk storage, and may contain a conventional database.

In one embodiment, the information described above may be gathered in response to an inventory request message in the same manner as described above. An inventory request message is a message that requests whether the applications named in the message are installed on client system 202. In this embodiment, either all of the inventoried applications will be tracked, or a manifest is received that specifies which of the inventoried applications are tracked. If only some of the inventoried applications are tracked, subsequent to the inventory process described above, a manifest is received as described above. The manifest describing applications to be tracked contains the name of the inventoried applications to be tracked. When the manifest describing the inventoried applications to track is received by automatic inventory identifier 230, it locates the entries for such applications in tracked inventory storage 234 and marks the entries in tracked inventory storage 234 as entries corresponding to inventoried applications that should be tracked.

As noted above, if some or all of the previously described characteristics about certain applications are not known, another message may be received by communication interface 210 describing a different number of, or other kinds of characteristics of such applications. For example, if it is desirable to track unauthorized music sharing programs, the previously-described characteristics of all versions of such programs may not be known. In such embodiment, the executable file name and usual installation directory of all such programs may be included in this other message as the characteristics for each such application. (Although two messages are described herein, the two messages describing the different type of tracked applications may be combined into a single message, with such message designating the type of each of two sets of applications to be tracked. In one embodiment, more than two type of tracked applications may be employed: the two above and other types as well).

When such a message is received, communication interface 210 passes the message to message manager 220. Message manager 220 inspects the header of the message, which contains a flag identifying it as the type of message described above. In response to the flag, message manager 220 passes the message to manual inventory identifier 232.

Manual inventory identifier 232 checks to see if an application with the specified characteristics exists on the client computer system 202. In the case in which the name of the executable file and the path are the characteristics specified, manual inventory identifier 232 checks with operating system 240 to identify whether a specified file in the specified path exists on the user's computer system (if other characteristics are specified, manual inventory identifier 232 uses operating system 240 to attempt to locate files with such other characteristics) for each such tracked application specified in the message. For each such application it locates, manual inventory identifier 232 uses the header of the executable file to extract any or all of the name of the application, version, manufacturer name, and process identifier and stores the information and the filename and path of the executable as an entry into tracked inventory storage 234. (In the embodiment in which some inventoried applications are not tracked, manual inventory identifier 232 would also mark these entries as applications that should be tracked.)

When automatic inventory identifier 230 or manual inventory identifier 232 receives and processes a message containing one or more applications to track as described above, in one embodiment, each will request the running status of status change identifier 252, and if status change identifier 252 is not running, will cause it to run. In another embodiment, status change identifier 252 is configured to run continuously when the operating system 240 on the client computer system 202 is started.

Request Status and Update Prior Status

When started, status change identifier 252 signals status request manager 250. Status request manager 250 requests from operating system 240 the process identifiers of some, most, or all running processes. In one embodiment, to request such information, status request manager 250 uses the conventional CreateToolHelp32Snapshot command and receives a handle to a list of identifiers of some, most or all of the processes running on client computer system 202. To retrieve the identifiers from the list, status request manager 250 uses the conventional Process32First command (to retrieve the first item from the list) and the conventional Process32Next command (to retrieve each of the subsequent items from the list). For each process identifier received in this manner, status request manager 250 identifies the handles of the modules that make up the process, for example, using the conventional EnumProcessModules API, and for the first such module (or all modules) for each process, uses the conventional GetModuleFileNameEx API to retrieve the path and filename of the executable that corresponds to that module. Status request manager 250 builds a list of the paths and filenames corresponding to the list of running processes. In one embodiment, as it builds the list, status request manager 250 checks to see whether the path and filename correspond to the tracked applications in tracked inventory storage 234. If it doesn't, status request manager 250 does not include it on the list.

When status request manager 250 has received the list of the paths and filenames for the first module or all the modules of the processes running on client system 202, status request manager 250 provides the list to status change identifier 252.

Status change identifier 252 identifies the differences in status, if any, since the last time it was signaled to do so. In one embodiment, this can be done after the list has been received, by comparing the list of filenames and paths corresponding to currently operating processes to a list of filenames and paths corresponding to processes operating at a prior time, as is now described herein. In another embodiment, a list of filenames and paths corresponding to the currently running processes (or those corresponding to tracked applications) is maintained as the current list is retrieved, with new filenames and paths identified as such, and then, once the entire list has been retrieved for example, filenames and paths previously running (and therefore on the list), but no longer running (and therefore not received from status request manager 250), may also be identified and removed from the list.

In the embodiment, in which a current and prior list are stored and compared, in one embodiment, status change identifier 252 requests the date and time from operating system 240 and stores the date and time the list is received from status request manager 250 in a buffer of a double buffer in status storage 254 that is not marked as current, and marks that buffer as "current", and marks the other buffer of the double buffer in status storage 254 as "prior". At this point, because the procedure described herein has just started, the prior buffer will be empty. In the case in which the prior buffer is empty, status change identifier 252 signals operating system 240 to set a timer, such as an operating system timer, for a future time, such as five seconds from the current time that signals status change identifier 252, and status change identifier 252 complies with the request.

When the timer signal is received, status change identifier 252 again signals status request manager 250, which provides the list of process identifiers as described above. Status change identifier 252 stores the list and the current date and time (which it requests again from operating system 240) into the buffer in status storage 254 not marked as current, and marks that buffer as current and marks the other buffer as prior as described above.

This time, when status change identifier 252 will check the prior list and it will not be empty: it will correspond to the processes operating on the client computer system when the list was received at the prior time. As a result of the prior list not being empty, status change identifier 252 selects from status storage 254 one of the executable filenames and paths that corresponds to a tracked application and attempts to locate it in the prior list and the current list in status storage 254.

If an executable filename and path is on the current list, but not on the prior list, the user has started the application corresponding to the executable since the prior list of processes running on the client computer system 202 was obtained as described herein. Status change identifier 252 adds an entry into the status log 256 indicating that the application has been started, the date and time stored with the current list, and the name of the application (or the name of the application may be added later as described below), filename and path of the executable of the application, and, optionally, other information. To obtain the name of the application and any other information, status change identifier 252 uses the filename and path to look up the characteristics stored in tracked inventory storage 234 as described above, and stores into the entry in the status log 256 some or all of the information stored for the application corresponding to the name and path.

If an application name and path is on the current list, and it is also on the prior list, both in status storage 254, the user has continued to use application since the prior list of processes running on the client computer system 202 was obtained as described herein, and thus, there is no change in status regarding the corresponding application. Status change identifier 252 simply discards the process identifier.

If an application filename and path is not on the current list, but is on the prior list in status storage 254, the user has terminated the application since the prior list of processes running on the client computer system 202 was obtained as described herein. In this case, status change identifier 252 adds to the status log 256 a new entry similar to the entry it added when it detected that the application had been started as described above, but indicates that the entry corresponds to the application being terminated instead of being started up as described above.

As noted below, entries corresponding to applications that have been terminated may include the date and time the application was also most recently started from the nearest entry in the status log having the same file name and path preceding the entry added, if any.

The status log 256 is made of conventional storage, such as memory or disk storage, which may be arranged as a circular buffer, whereby older entries are overwritten by newer ones when the log is full. Status log 256 is sized sufficiently large enough to handle a reasonable maximum number of entries expected during a single reporting period as described in more detail below.

In one embodiment, a single entry in the status log is used for the startup and termination of each application instead of one entry for startup and one entry for termination as described above. In such embodiment, the entry does not have a field to indicate whether the application was detected as started or terminated. Instead, each entry has a field for the startup date and time and another field for the termination date and time. The entry is added when startup of an application is detected as described above, with the termination date and time set to a particular value, such as zero. When status change identifier 252 detects the termination of an application, it locates the entry corresponding to that application (e.g. using the process identifier) with the termination date and time set to the particular value described above and the latest startup date and time. In such embodiment, when it adds the termination date and time, status change identifier 252 may also compute the duration of use of the application by subtracting the startup date and time from the termination date and time for that entry and storing the result in a duration field of the entry in status log 256.

In still another embodiment, a combination of the two are used. One entry is added when the application starts as described above, listing the start time, however, when the application terminates, another entry is added as described above, containing both the start and the termination times.

If there are more tracked applications in tracked inventory storage 234, status change identifier 252 selects the next tracked application and repeats the process described above, updating the status log for entries that are on one list but not the other as described above.

When status change identifier 252 completes updating the status log 256 and status storage 254, status change identifier 252 sets the timer in operating system 240 to signal at a later period, such as approximately five or ten seconds after the prior timer signal was received or five or ten seconds from the present time, although other signal periods may be used. In another embodiment, instead of setting a timer, status change identifier 252 signals operating system 240 to put the process containing status change identifier 252 and status request manager 250 to sleep for a period similar to those described above. In either such embodiment, the timer or wake signal triggers the operation of status change identifier 252, which then signals status request manager 250 as described above.

Status change identifier 252 and status request manager 250 then repeat the process of identifying the running applications and performing the updates, and resetting the timer as described above so that the process described above is periodically repeated upon the timer or wake signal received from operating system 240.

In one embodiment, after the timer or wake signal is received but before performing the comparison described above, status change identifier 252 signals either or both of automatic inventory identifier 230 or manual inventory identifier 232 to repeat the process of identifying tracked applications installed on client system 202, so that applications installed after the characteristics describing them are received, will be detected. Each 230, 232 will report to status change identifier 252 if an installed tracked application is no longer installed, and, if status change identifier 252 last recorded in the status log 256 that operation of the application was initiated, status change identifier 252 will treat the application as having had its operation terminated as described above. As applications are detected as installed or uninstalled, the inventory identifier 230, 232 that performed such detection may record using an entry in status log 256 an indication of the event with the other information described above in the entries in the status log as described above.

The reidentification of tracked applications and detection of an uninstall of a tracked application may be detected by storing the messages that describe the characteristics of the tracked applications into an area of tracked inventory storage 234 and marking those found. Each of the inventory identifiers 230, 232 may mark in tracked inventory storage 234 the entries it adds so that that inventory identifier 230, 232 can remove its own entries. When signaled by status change identifier 252, each inventory identifier 230, 232 will remove its entries from tracked inventory storage 234, attempt to reidentify tracked applications as described above, and then add new entries to tracked inventory storage 234 as described above. The entries are compared by the inventory identifier 230, 232 with its corresponding marked message in tracked inventory storage 234, the markings of the messages updated, and any formerly installed tracked application that is no longer installed is marked as terminated and uninstalled in the corresponding entry in the status log 256.

Other methods of maintaining the prior list may be used instead of using the former current list. For example, as status change identifier 252 performs the steps described above, it may maintain the prior list to use for the next iteration of the process described above by copying the filename and path of newly-installed tracked applications to the prior list from the list received from status request manager 250 and by removing from the prior list the information corresponding to terminated tracked applications. In other words, status change identifier 252 may maintain the prior list as described in FIG. 3, steps 330 and 342, below.

In one embodiment, message manager 220 stores the most current of each of the two types of messages it receives into a file (not shown) so that the entire set of each of both types of tracked applications are stored in a persistent file. Message manager 220 registers itself to operating system 240 so that operating system will start message manager each time client computer system 202 is started. Message manager 220 then acts as if all of the stored messages were just received to allow the inventory process to occur as described above at each system startup.

Server

Server 204 communicates with each of one or more clients similar to client 202, for example to provide their status logs, reported since the prior report was submitted as described in more detail below. In one embodiment, all communication between server 204 and network 206 is made via input/output 268 of communication interface 270 which is coupled to network 206. Communication interface 270 is a conventional communication interface that supports TCP/IP or other conventional communication protocols.

In one embodiment, at startup of server 204, and at subsequent reporting periods, message manager 280 sends client system 202 a request to provide the entries in status log 256 that were not already sent in response to a prior request. Message manager 280 builds the request and sends it to communication interface 270, which provides it via input/output 268 over network 206, which forwards it to communication interface 210 via input/output 208, which forwards it to message manager 220.

Message manager 220 receives the request, and examines the header, which identifies it as a request as described above. Message manager 220 then forwards the message to status report manager 260. Status report manager 260 receives the request and retrieves the records from the status log 256 that have not already been sent in response to a prior request for which a confirmation has been received as described below. Status report manager 260 tentatively marks in status log 256 the last record it sends, pending receipt of a confirmation from message manager 280 as described below. In the embodiment in which a single record contains the start and termination dates and times (and optionally, a duration) as described above, status report manager 260 only retrieves the records for which the termination date and time are not the initialized value (i.e. it only retrieves completed records), and tentatively marks as retrieved each record that it so retrieves.

Status report manager 260 then sends via message manager 220, communication interface 210, network 206, and communication interface 270 a response to the request that includes an identifier of the client system and the retrieved records, with a header identifying it as such. Some or all of the information from tracked inventory storage 234 may also be supplied by status report manager 260. Such information may have been placed into the status log by status change identifier 252 or status report manager 260 by matching the filename and path of the executable in each entry in the status log with the filename and path from tracked inventory storage 234, or, in another embodiment, status report manager 260 may provide the contents of tracked inventory storage 234 separately. In such embodiment, entries in tracked inventory storage 234 are maintained and marked as deleted instead of being deleted until they are no longer needed. Status report manager 260 then sets a timer using operating system 240, for use as described below.

Communication interface 270 receives the response and sends it to message manager 280, which, based on the message header, stores the records and other information received into database 282, and adds the client identifier to each record. Message manager 280 then sends to client system 202 via communication interface 270, network 206, and communication interface 210, an acknowledgement that it has received the records. In one embodiment, message manager 280 checks the response for errors using conventional error detection techniques upon receipt of the response, and discards the response and does not send the acknowledgement if one or more errors are detected.

Communication interface 210 passes the acknowledgement to message manager 220, which notifies status report manager 260 that the acknowledgement was received. Status report manager 260 changes the tentative mark of the last record to a sent mark, or in another embodiment, marks as sent all of the records marked as retrieved as described above.

If status report manager 260 does not receive an indication that the acknowledgement has been received when it receives notification from the operating system that the timer it set as described above has gone off, status report manager 260 will repeat the process of generating and sending a new status report as described above, and this process may be repeated a number of times. If no acknowledgement is received, status report manager unmarks the records in status log 256 and internally logs an error.

Message manager 280 signals operating system 284 to set a timer. When the timer goes off, message manager 280 repeats the reporting process.

In one embodiment, instead of being initiated by message manager 280 in response to a timer signal from operating system 284 as described above, the transmission of unsent completed records and the client identifier are initiated by a timer signal from operating system 240 made to status report manager 260. The first such timer may be initiated by message manager 220 signaling status report manager 260 at system startup, and a default timer period may be used by status report manager 260 to set the first timer. In such embodiment, the acknowledgement received as described above may include the period of time before another transmission of unsent completed records and the client identifier should be made. Status report manager 260 receives the period from message manager 220, and uses it to set an operating system timer or wake up signal that will cause it to make another such transmission after the specified period elapses. If an acknowledgement is received without specifying a different period, status report manager 260 uses the prior period.

Reports

Database 282 may include conventional storage such as memory or disk storage and may contain a conventional database, such as a conventional ORACLE 9i or 10g database commercially available from ORACLE Corporation of Redwood Shores, Calif., conventional SQL SERVER database product commercially available from MICROSOFT Corporation of Redmond, Wash., the conventional DB2 database product commercially available from INTERNATIONAL BUSINESS MACHINES Corporation of White Plains, N.Y. or any other conventional database product such as an SQL-compatible database.

A system administrator may use system administration computer system 290, which may be a suitably equipped computer system, to generate queries to database 282 and receive the results of such queries. To generate such queries, the system administrator uses input/output devices 298, such as conventional keyboard/mouse/monitor components, to define a query to report manager 296, which may contain a conventional database client product or a communication product capable of communicating with database 282 to send queries and receive the results.

Report manager 296 receives such queries from input/output devices 298, optionally formats them, and provides them to communication interface 294, which includes a conventional communication interface that is similar or identical to communication interfaces 270, 210 described above. Communication interface 294 forwards the query, which may be in the form of a conventional SQL query, to database 282 via input/output 292, network 296 and communication interface 270. Database 282 provides a response to the query using conventional techniques. Communication interface 294 receives the query result via the reverse path as was used to send the query, and provides such result to report manager 296, for display to the user via a monitor that is part of input/output devices 298, printing via a printer that is part of input/output devices 298, output to a disk drive that is part of input/output devices 298, or transfer to a file either via a disk drive that is part of input/output devices 298 or to a remote disk drive coupled to network 206.

Queries may be made to report manager 296 to show the client identifiers of all client systems for which an application is used in a manner that exceeds, meets or does not meet a threshold quantity related to use of a given program, or a set of programs that may be defined by the system administrator performing the queries. Such a quantity may be an average duration of use during any one day over a period such as a week or a month, or a number of starts during a period such as a day, week or month. Queries may be made to report manager 296 to identify applications whose average use meets, exceeds or does not exceed a threshold quantity related to use such as those described above. Each application may be specified in a query by its name, or any of the other information in the database regarding the application.

If the client system identifiers are related to type of user, location of user, or other characteristics, via a conventional relational table, such queries can be made using any other such characteristics. The system administrator can then determine whether an application should be upgraded, installed or removed to or from a user or users of a certain type or sharing certain characteristics based on this information.

In one embodiment, report manager 296 automatically makes decisions regarding one or more software installation activities according to rules it stores, having been received from the system administrator via input/output devices 298.

To make such decisions, report manager 296 periodically runs its own sets of reports and then instructs message manager 280 to send messages to certain client systems to perform software installation/removal activities, such as removing software, or installing software such as a new application or an upgrade or update. In one embodiment, the messages will be sent in response to a message from channel manager 262 requesting an update as described in the related patent. In another embodiment, the message is sent by message manager 280, which instructs channel manager 262 to subscribe to a channel or unsubscribe from a channel and remove the related software by requesting from message manager 280 an "update" that will take the software from its current version to a pseudo-version that in fact removes the software. Message manager 280 sends instructions and files related to any such update or pseudo update in response to such request as described in the related application. In one embodiment, communication between message manager 280 and channel manager 262 is made via communication interfaces 210 and 270 and via message manager 220, which routes the messages to either channel manager 262 or message manager 280 based on the header of the message.

In one embodiment, a table of names of applications on the one hand, and the filename and path of the executable of the applications on the other hand, may be provided by a system administrator or other entity to report manager 296. Report manager 296 uses the table to convert or append the name of the application from or to the name and path of the application in the reports it provides.

Initiation of Messages

In one embodiment the two types of messages that describe the tracked applications as described above are provided by message manager 280. Message manager 280 stores the IP addresses or URLs of all of the client systems such as client system 202 to which such messages should be sent. The system administrator defines the messages using input/output devices 298, by connecting to message manager 280 via communication interface 294, network 206 and communication interface 270. Message manager 280 provides a user interface to allow the system administrator to specify one or more of either of the two types of tracked applications and receives such specification or specifications. Message manager 280 then formats the specifications into the messages described above and provides them to the client systems having the identifiers it stores as described above, including client system 202 as described above.

Figures 3, 4, 5:
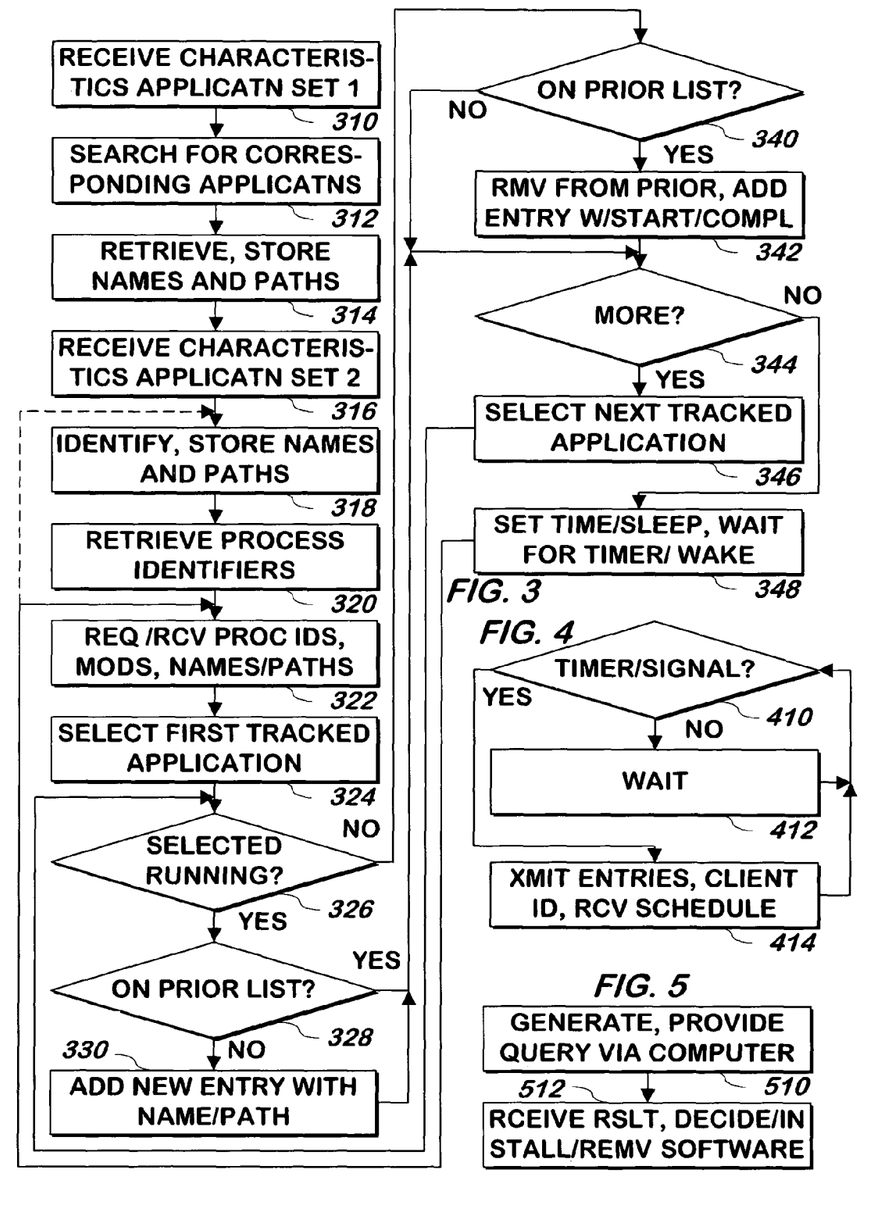
FIG. 3 is a flowchart illustrating a method of logging usage of tracked applications according to one embodiment of the present invention
FIG. 4 is a flowchart illustrating a method of providing to a server the software usage information collected in FIG. 3 according to one embodiment of the present invention.
FIG. 5 is a flowchart illustrating a method of deciding the installation or removal of, and installing or removing, software according to one embodiment of the present invention.

Referring now to FIG. 3, a method of logging usage of tracked applications is shown according to one embodiment of the present invention. A first set of one or more characteristics of applications, such as the name of the applications, is received 310 and applications meeting those set of characteristics are located 312 and the names and paths of those applications are optionally identified 314 and stored for those located as described above. A second set of one or more characteristics of applications, such as filename and path of the executable file for those applications, is received 316 and applications meeting those set of characteristics are located 318 and the names and paths are optionally identified 320 and stored for those located as described above. The first set and second set of characteristics may differ entirely or partially, and each set may have a different number or kind of characteristics for each application described, as described above.

The process identifiers, module names for those process identifiers and file names and paths of the modules are requested and received 322 for all processes running on the client computer system as described above. The first of the tracked applications, which are the located processes having the identifiers received in steps 314 and 320, is selected 324. If the selected tracked application is running 326 and it is not on a list of tracked applications running previously 328 (referred to as the prior list), the name and path of the selected tracked application is added to the prior list and an entry is made for the tracked application, computer system identifier and starting time equal to the current time 330 and the method continues at step 344 described below.

If the selected tracked application was running 326 and was on the prior list 328, the method continues at step 344 described below. If the selected tracked application was not running 326, if the selected tracked process was not on the prior list 340, the method continues at step 344.

If the selected tracked application was not running 326, if the selected tracked application was on the prior list 340, the name and path for that tracked application is removed from the prior list and an entry with the current date and time as the ending time, the process identifier and path is added to the status log as described above, or the corresponding entry for such process is completed by adding the current date and time as the ending time as described above 342 and the method continues at step 344.

At step 344, if there are more tracked applications that were located in steps 312 and/or 318, the next tracked application is selected 346 and the method continues at step 326. If there are no more tracked applications 344, a timer or sleep arrangement is set and the method waits for the timer to signal it or for the sleep arrangement to wake it up 348, and the method continues at step 322 in one embodiment, 318 in another embodiment (illustrated by the dashed line in the figure). In still another embodiment, the method continues at step 312 and step 316 follows step 310 and is performed before step 312.

Referring now to FIG. 4, a method of providing to a server the software usage information collected in FIG. 3 is shown according to one embodiment of the present invention. If a timer or other signal such as a message is not received 410, the method waits 412 and continues at step 410 as described above. Otherwise 410, entries including some or all of the information collected in FIG. 3 are transmitted to a server along with an identifier of the client machine corresponding to the information transmitted as described above and information regarding the timing of a subsequent transmission may be received from the server and used to set the timer used in step 412 and the method continues at step 410. Step 414 may include sending and receiving a message from the server that is itself received in response to the timer signal.

Referring now to FIG. 5, a method of deciding the installation or removal of, and installing or removing, software is shown according to one embodiment of the present invention. A query is made to a database containing information regarding software usage from one or more client computer systems 510 and the result of the query is received. One or more decisions regarding the installation or removal of software, such as a new software application or an update or upgrade are made and the one or more decisions may be carried out via an installation activity, such as removing software, licensing software, or installing software such as a new application or an upgrade or update via the system and/or method described in the related application 512.

What is claimed is:

1. A method of providing information about software usage, comprising:
   on each of a plurality of first computer systems:
      automatically identifying, for each of a plurality of computer software applications, at least one first time at which an operation of said computer software application was detected to have been started;
      automatically identifying, for each of the plurality of computer software applications at least one second time at which the operation of said computer software application was detected to have been stopped, wherein the act of identifying, for each of a plurality of computer software applications, at least one second time comprises:
         making a first request to and receiving from an operating system, a first set of identifiers of a plurality of programs running at approximately the time of said first request;
         making a second request to and receiving from the operating system, at a time later than a time of the first request, a second set of identifiers of a plurality of programs running at approximately the time of said second request; and
      for a given one of the plurality of computer software applications:
         locating an identifier of the given one of the plurality of computer software applications in the first set of identifiers; and
         not locating the identifier of the given one of the plurality of computer software applications in the second set of identifiers; and
      storing said first and second times in at least one record associated with an identifier of said computer software application; and
   on a second computer system, receiving a query regarding the at least one record and providing at least one result to the query responsive to a plurality of the at least one records from at least two of the plurality of first computer systems.

2. The method of claim 1, additionally comprising, responsive to the result, performing at least one software installation/removal activity comprising at least one selected from:
   installing software;
   removing software;
   upgrading software; and
   denying at least one selected from installation of software; upgrade of software; and
   removal of software.

3. The method of claim 1, wherein the act of identifying, for each of a plurality of computer software applications, at least one first time comprises:
   making a first request to and receiving, from an operating system, a first set of identifiers of a plurality of programs running at approximately the time of said first request;
   making a second request to and receiving from the operating system, at a time later than a time of the first request, a second set of identifiers of a plurality of programs running at approximately the time of said second request; and
   for a given one of the plurality of computer software applications:
      not locating an identifier of the given one of the plurality of computer software applications in the first set of identifiers; and
      locating an identifier of the given one of the plurality of computer software applications in the second set of identifiers.

4. The method of claim 1, additionally comprising the steps:
   on each of the plurality of first computer systems, transmitting to the second computer system said at least one record for each of at least one of the computer software applications; and
   at the second computer system, storing the plurality of records transmitted.

5. The method of claim 4 wherein the act of transmitting is responsive to a request received from the second computer system.

6. The method of claim 4 wherein the act of transmitting is responsive to at least an approximate time provided by the second computer system.

7. The method of claim 1 additionally comprising steps of:
   receiving at least one set of characteristics of the plurality of computer software applications;
   locating the plurality of computer software applications responsive to the characteristics in the at least one set; and
   obtaining at least one identifier for each of the plurality of computer software applications responsive to the locating step; and wherein the acts of identifying are responsive to the at least one identifier obtained.

8. The method of claim 7 wherein:
the at least one set of characteristics comprise a first set of at least one characteristics corresponding to a first type of the plurality of computer software applications, and a second set of at least one characteristics corresponding to a second type of the plurality of computer software applications; and
at least one selected from a kind and a number of characteristics in the first set and the second set are different.

9. A computer network system for providing information about software usage, comprising:
on each of a plurality of first computer systems, wherein each of the first computer systems is communicatively coupled to a computer network;
each of the first computer systems comprises a computer readable program code device and a programmable processing unit configured to execute:
a status manager having an input for receiving information about each of a plurality of software applications, the status manager automatically identifying for each of the plurality of computer software applications, at least one first time at which an operation of said computer software application was detected to have been started, the status manager additionally automatically identifying for each of the plurality of computer software applications at least one second time at which the operation of said computer software application was detected to have been stopped, the status manager additionally providing at an output at least one record comprising said first and second times associated with an identifier of said computer software application, wherein the status manager comprises:
a status request manager for:
making a first request to and receiving, from an operating system, a first set of identifiers of a plurality of programs running at approximately the time of said first request;
making a second request to and receiving, from the operating system, at a time later than a time of the first request, a second set of identifiers of a plurality of programs running at approximately the time of said second request; and
providing the first and second set of identifiers at an output; and
a status change identifier having an input coupled to the status manager output for receiving the information about each of a plurality of software applications, the status change identifier for, for a given one of the plurality of computer software applications, providing at an output coupled to the status manager input the at least one second time responsive to:
the status change identifier locating an identifier of the given one of the plurality of computer software applications in the first set of identifiers; and
the status change identifier not locating an identifier of the given one of the plurality of computer software applications in the second set of identifiers; and
a query manager on a second computer system communicatively coupled to the computer network, the query manager having a record input coupled to the status manager output of at least two of the plurality of first computer systems for receiving at least a portion of at least some of the records provided by said status managers, the query manager additionally having a query input for receiving a query regarding the at least one record, the query manager for providing at an output at least one result to the query responsive to the query and the at least one portion of at least some of the records.

10. The computer network system of claim 9, additionally comprising, a channel manager having an input coupled to the query manager output for receiving the result, the query manager for, responsive to the result, performing at least one software installation/removal activity comprising at least one selected from:
installing software;
removing software;
upgrading software; and
denying at least one selected from installation of software; upgrade of software; and
removal of software.

11. The computer network system of claim 9, wherein the status manager comprises:
a status request manager for:
making a first request to and receiving, from an operating system, a first set of identifiers of a plurality of programs running at approximately the time of said first request;
making a second request to and receiving, from the operating system, at a time later than a time of the first request, a second set of identifiers of a plurality of programs running at approximately the time of said second request; and
providing the first and second set of identifiers at an output; and
a status change identifier having an input coupled to the status manager input for receiving the information about each of a plurality of software applications, the status change identifier for, for a given one of the plurality of computer software applications, providing at an output coupled to the status manager output the at least one first time responsive to:
the status change identifier not locating an identifier of the given one of the plurality of computer software applications in the first set of identifiers; and
the status change identifier locating an identifier of the given one of the plurality of computer software applications in the second set of identifiers.

12. The computer network system of claim 9, additionally comprising:
on each of the plurality of first computer systems, a status report manager having an input coupled to the status manager output, the status report manager for receiving the at least one record, the status report manager for transmitting to the second computer system said at least one record for each of at least one of the computer software applications; and
at the second computer system, a message manager having an input coupled to the status report managers, the message manager for storing the plurality of the at least one record received at the message manager input.

13. The computer network system of claim 12 wherein the status report manager transmits said at least one record responsive to a request received from the second computer system.

14. The computer network system of claim 12 wherein the status report manager transmits said at least one record responsive to at least an approximate time provided by the second computer system.

15. The computer network system of claim 9:
additionally comprising at least one inventory identifier, each having an input for receiving at least one set of characteristics of the plurality of computer software applications, each of the at least one inventory identifier for locating the plurality of computer software applications responsive to the characteristics in the at least one set received at the inventory identifier input, all of the inventory identifiers for obtaining at least one identifier for each of the plurality of computer software applications responsive to the locating step and providing the at least one identifier at an output coupled to the status manager input; and
wherein the information about each of a plurality of software applications received at the status manager input comprise the at least one identifier of the plurality of applications provided at the inventory identifier output.

16. The computer network system of claim 15 wherein:
the at least one set of characteristics comprise a first set of at least one characteristics corresponding to a first type of the plurality of computer software applications, and a second set of at least one characteristics corresponding to a second type of the plurality of computer software applications; and
at least one selected from a kind and a number of characteristics in the first set and the second set are different.

17. A computer program product having computer readable program code embodied therein to configure a processor to provide information about software usage, the computer program product comprising computer readable program code to:
cause each of a plurality of first computer systems to:
automatically identify, for each of a plurality of computer software applications, at least one first time at which an operation of said computer software application was detected to have been started;
automatically identify, for each of the plurality of computer software applications at least one second time at which the operation of said computer software application was detected to have been stopped, wherein the act of identifying said computer software application stopped comprises:
making a first request to and receiving from an operating system, a first set of identifiers of a plurality of programs running at approximately the time of said first request;
making a second request to and receiving from the operating system, at a time later than a time of the first request, a second set of identifiers of a plurality of programs running at approximately the time of said second request; and
for a given one of the plurality of computer software applications:
locating an identifier of the given one of the plurality of computer software applications in the first set of identifiers; and
not locating the identifier of the given one of the plurality of computer software applications in the second set of identifiers; and
store said first and second times in at least one record associated with an identifier of said computer software application; and
cause a second computer system to receive a query regarding the at least one record and provide at least one result to the query responsive to a plurality of the at least one records from at least two of the plurality of first computer systems.

18. The computer program product of claim 17, additionally comprising computer readable program code to configure a processor to, responsive to the result, cause at least one of the computers to perform at least one software installation/removal activity comprising at least one selected from:
install software;
remove software;
upgrade software; and
deny at least one selected from installation of software;
upgrade of software; and
removal of software.

19. The computer program product of claim 17, wherein the computer readable program code comprises instructions to cause each of the first computers to:
make a first request to and receive from an operating system, a first set of identifiers of a plurality of programs running at approximately the time of said first request; and
make a second request to and receive from the operating system, at a time later than a time of the first request, a second set of identifiers of a plurality of programs running at approximately the time of said second request; and
for a given one of the plurality of computer software applications:
not locate an identifier of the given one of the plurality of computer software applications in the first set of identifiers; and
locate an identifier of the given one of the plurality of computer software applications in the second set of identifiers.

20. The computer program product of claim 17, additionally comprising computer readable program code to configure a processor to:
cause each of the plurality of first computer systems to transmit to the second computer system said at least one record for each of at least one of the computer software applications; and
cause the second computer system to store the plurality of records transmitted.

21. The computer program product of claim 20 wherein the computer readable program code comprises instructions to cause each of the plurality of first computer systems to transmit are responsive to a request received from the second computer system.

22. The computer program product of claim 20 wherein the computer readable program code comprises instructions to cause each of the plurality of first computer systems to transmit are responsive to at least an approximate time provided by the second computer system.

23. The computer program product of claim 17 additionally comprising computer readable program code to configure a processor to cause each of the plurality of first computer systems to:
receive at least one set of characteristics of the plurality of computer software applications;
locate the plurality of computer software applications responsive to the characteristics in the at least one set; and
obtain at least one identifier for each of the plurality of computer software applications responsive to the locating step; and
wherein the computer readable program code configures a processor to cause each of the plurality of first computer systems to identify are responsive to the at least one identifier obtained.

24. The computer program product of claim 23 wherein:
the at least one set of characteristics comprise a first set of at least one characteristics corresponding to a first type of the plurality of computer software applications, and a second set of at least one characteristics corresponding to a second type of the plurality of computer software applications; and
at least one selected from a kind and a number of characteristics in the first set and the second set are different.

25. A computer network system providing information about software usage, comprising:
on each of a plurality of first computer systems, wherein each of the first computer systems comprises a programmable processing unit and a computer readable program code device and is communicatively coupled to a computer network, the programmable processing unit configured to perform the acts of:
make a first request to an operating system and receiving, from the operating system, a first set of identifiers of a plurality of programs running at approximately the time of said first request; and
make a second request to the operating system and receiving, from the operating system, at a time later than time of the first request, a second set of identifiers of a plurality of programs running at approximately the time of said second request;
determine for a given one of the plurality of computer software applications if the given computer software application has started executing or stopped executing between time of the first request and time of the second request;
store an indication of one or more computer software applications determined to start executing or stop executing in at least one record; and
on a second computer system, receive a query regarding the at least one record and providing at least one result to the query responsive to a plurality of the at least one records from at least two of the plurality of first computer systems.

26. A computer program product having computer readable program code embodied therein for configuring a processor to provide information about software usage, the computer program product comprising executable instructions to:
configure a first processor on each of a plurality of first computer systems to:
make a first request to an operating system and receiving, from the operating system, a first set of identifiers of a plurality of programs running at approximately the time of said first request; and
make a second request to the operating system and receiving, from the operating system, at a time later than time of the first request, a second set of identifiers of a plurality of programs running at approximately the time of said second request;
determine for a given one of the plurality of computer software applications if the given computer software application has started executing or stopped executing between time of the first request and time of the second request;
store an indication of one or more computer software applications determined to start executing or stop executing in at least one record; and
configure a second processor on a second computer system to receive a query regarding the at least one record and providing at least one result to the query responsive to a plurality of the at least one records from at least two of the plurality of first computer systems.

* * * * *

UNITED STATES PATENT AND TRADEMARK OFFICE
CERTIFICATE OF CORRECTION

| | |
|---|---|
| PATENT NO. | : 7,925,635 B1 |
| APPLICATION NO. | : 11/112175 |
| DATED | : April 12, 2011 |
| INVENTOR(S) | : Ravulur et al. |

It is certified that error appears in the above-identified patent and that said Letters Patent is hereby corrected as shown below:

In column 14, line 45-46, in claim 4, delete "comprising the steps:" and insert -- comprising: --, therefor.

In column 14, line 59, in claim 7, delete "comprising steps of:" and insert -- comprising: --, therefor.

Signed and Sealed this
Sixteenth Day of August, 2011

David J. Kappos
*Director of the United States Patent and Trademark Office*